United States Patent [19]
Davis

[11] Patent Number: 5,193,216
[45] Date of Patent: Mar. 9, 1993

[54] DETECTING OUT OF RANGE IN RESPONSE TO A LOSS OF SIGNAL AND A HISTORY OF APPROACHING OUT OF RANGE PRIOR TO THE LOSS OF SIGNAL

[75] Inventor: Walter L. Davis, Coral Springs, Fla.

[73] Assignee: Motorola, Inc., Schaumburg, Ill.

[21] Appl. No.: 531,603

[22] Filed: Jun. 1, 1990

[51] Int. Cl.$^5$ .......................................... H04B 17/00
[52] U.S. Cl. ..................... 455/67.7; 455/226.2; 455/226.4; 455/229; 340/825.49
[58] Field of Search ............ 455/226, 67, 33, 52, 455/57, 228, 343, 229, 226.2, 226.4, 67.1, 67.7, 52.1, 57.1, 33.1; 340/825.44, 825.49, 825.36, 539, 571

[56] References Cited

U.S. PATENT DOCUMENTS

| | | |
|---|---|---|
| 4,331,953 | 5/1982 | Blevins et al. ............... 340/539 |
| 4,353,065 | 10/1982 | Mori ............................ 340/825.44 |
| 4,506,262 | 3/1985 | Vance et al. ................. 340/825.44 |
| 4,518,961 | 5/1985 | Davis et al. ................. 179/2 EC |
| 4,593,273 | 6/1986 | Narcisse ...................... 340/571 |
| 4,649,538 | 3/1987 | Deluca et al. ............... 371/25 |
| 4,755,816 | 7/1988 | Deluca ......................... 340/825.44 |
| 4,785,291 | 11/1988 | Hawthorne ................... 340/691 |
| 4,851,820 | 7/1989 | Fernandez .................... 455/226 |
| 4,928,086 | 5/1990 | Prapac et al. ................ 340/825.49 |
| 4,978,946 | 12/1990 | Nordhoim et al. ........... 340/573 |
| 5,049,875 | 9/1991 | Deluca et al. ............... 340/539 |

Primary Examiner—Reinhard J. Eisenzopf
Assistant Examiner—Edward Urban
Attorney, Agent, or Firm—Daniel R. Collopy; William E. Koch; Thomas G. Berry

[57] ABSTRACT

An out of range detector determines whether a communications device is out of range of its signal if the signal is not detected and a history of received signal strength values consistent with approaching out of range is measured prior to nondetection of the signal.

9 Claims, 4 Drawing Sheets

DETECTING OUT OF RANGE IN RESPONSE TO A LOSS OF SIGNAL AND A HISTORY OF APPROACHING OUT OF RANGE PRIOR TO THE LOSS OF SIGNAL

FIELD OF THE INVENTION

This invention relates in general to communications devices for receiving a signal, and in particular to an out of range detector for a communications device.

BACKGROUND OF THE INVENTION

Communications systems may utilize one or more than one transmitter to define a system coverage area. Every radio frequency (RF) transmitter has an associated geographical reception area within which communications devices, such as RF receivers, tuned to the appropriate frequency can receive transmissions from the RF transmitter. As the communications device increases its distance from the transmitter, reception on the assigned frequency becomes more difficult until, eventually, the device is out of range of the transmitter. Likewise, devices located outside a system coverage area will be out of range of the communications system.

The RF receiver will not receive any signals while out of range. Therefore, it is desirable that an RF receiver user be notified when the receiver is out of range. If the RF receiver is, for example, a selective call receiver and the user is expecting an important message, notification of out of range will indicate that the user needs to return to the network coverage area or access alternative methods for receiving messages.

Presently, RF receivers which receive a signal having a predetermined signalling protocol use the lack of detection of the predetermined signalling protocol to determine whether the receiver is out of range. Yet, several communications systems having various signalling protocols may share a single RF channel or frequency. Therefore, the out of range signal may erroneously be generated during the reception of signalling protocols of other communications systems even when the user is within the system coverage area because the predetermined signalling protocol is not received.

In addition, when the receiver is carried into a shielded area such as an elevator or a subway or even the shadow of a building, the out of range signal will be generated even if the user is still within the system coverage area because the predetermined signal is not periodically received.

Thus, what is needed is a method and apparatus for reliably detecting if a selective call receiver is within or out of the geographical coverage area of its transmitter.

SUMMARY OF THE INVENTION

Accordingly, it is an object of the present invention to provide an improved method and apparatus for detecting if a selective call receiver is out of range of its system coverage area.

In carrying out the above and other objects of the invention in one form, there is provided a method for detecting if a communications device is out of receiving range of its signal. If the communications signal is not detected and the signal strength measured prior to the loss of the signal is consistent with signal strength values approaching out of range, the communications device is determined to be out of range.

DETAILED DESCRIPTION OF THE INVENTION

Figure 1:
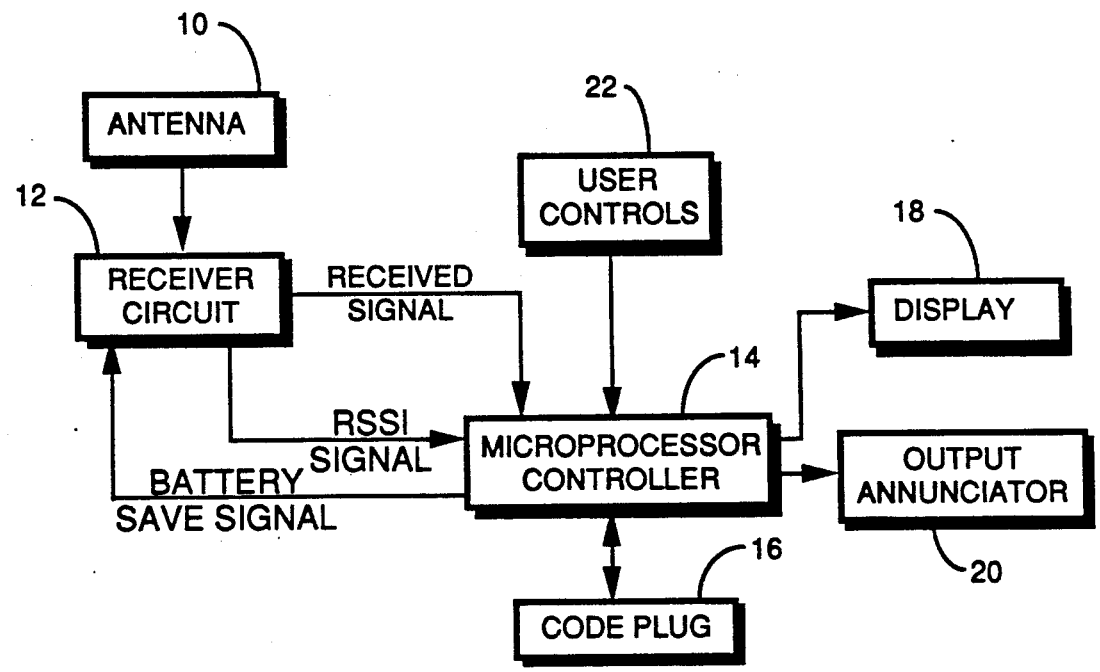
FIG. 1 is a block diagram of a communications device according to the present invention.

Referring to FIG. 1, a communications device, such as a selective call receiver, comprises an antenna 10 for receiving signals coupled to a receiver circuit 12 which demodulates the signals received. A microprocessor controller 14 is coupled to the receiver circuit 12 for processing the received signal. The microprocessor controller 14 also receives a received signal strength indicator (RSSI) signal from the receiver circuit 12. A battery save signal is provided to the receiver circuit 12 from the microprocessor controller 14 for toggling the receiver circuit 12 off and on as determined by the microprocessor controller 14 in a manner well known in the art. A code plug 16 is coupled to the microprocessor 14 for providing a set of predetermined information, such as the assigned frequency of the communications device, to the microprocessor 14 in a manner also well known in the art. A display device 18 visually displays information, such as a message received, and is controlled by the microprocessor controller 14. An output annunciator 20 is also controlled by the microprocessor controller 14 and may provide audible alerts for indicating various information to the user and/or audible output of the information of the received signal. User controls 22 allow the user to command the microprocessor controller 14 to perform operations of the device and typically includes control switches such as an on/off control button.

Figure 2:
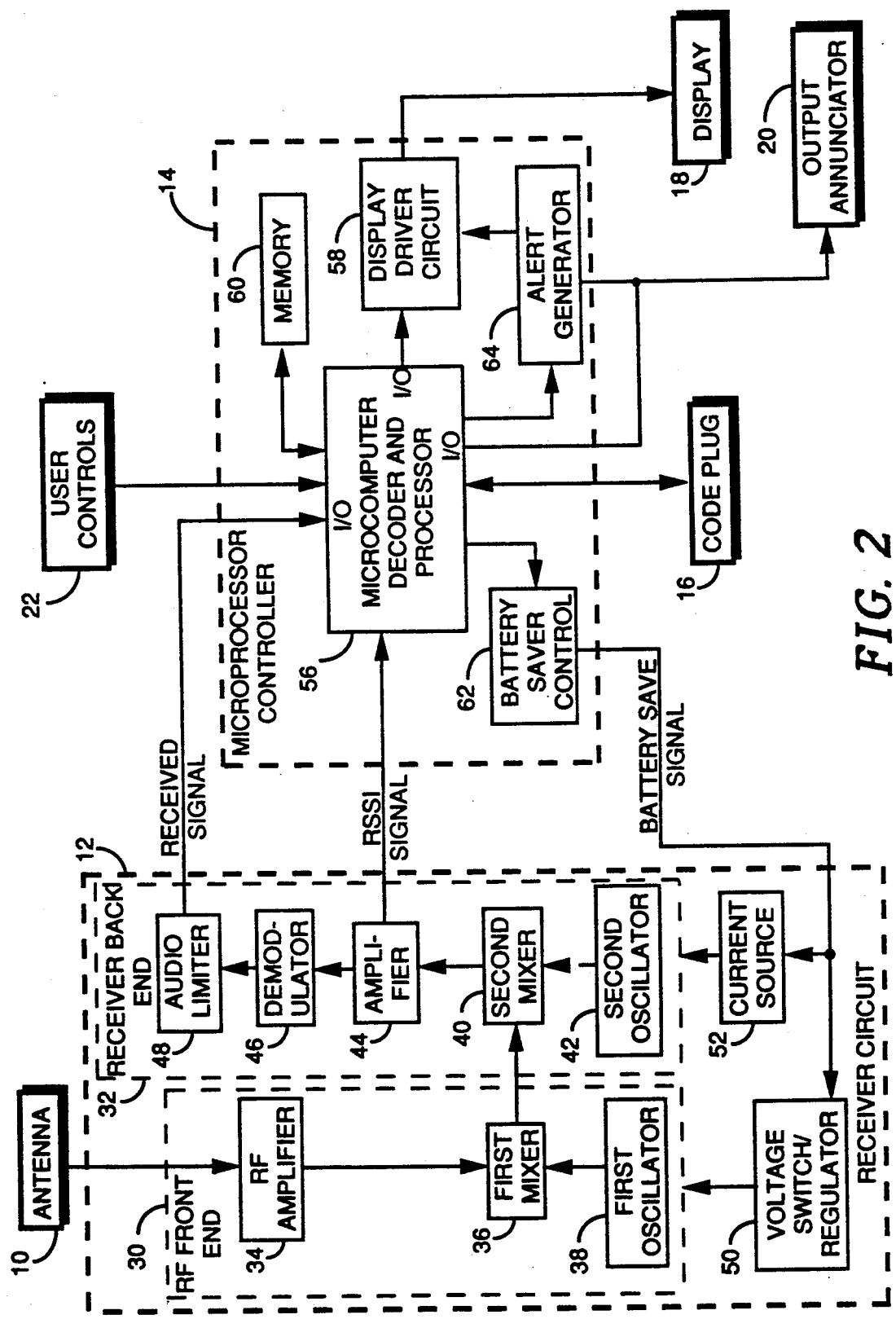
FIG. 2 is a more detailed block diagram of portions of the communications device.

Referring next to FIG. 2, the receiver circuit 12 of the communications device depicted in FIG. 1 comprises an RF front end 30 and a receiver back end 32. In a manner well known in the art, the signal provided to the RF front end 30 from the antenna 10 is provided to the input of an RF amplifier 34. The output of the RF amplifier 34 is provided to one of two inputs of a first mixer 36. The other input of the first mixer 36 is a signal from a first oscillator 38. The frequency of the signal from the first oscillator 38 is determined by the assigned frequency or channel upon which the communications device receives its signal.

The output signal from the first mixer 36 is provided to conventional circuitry of the receiver back end 32 comprising a second mixer 40, a second oscillator 42, an amplifier 44, a demodulator 46 and an audio limiter 48 for processing the signal received. In a manner well known in the art, the circuitry of the receiver back end 32 eliminates signals on adjacent channels and demodulates the received signal to provide an output to microprocessor controller 14. The amplifier 44 also measures the strength of the received signal and provides a received signal strength indicator (RSSI) signal to the microprocessor controller 14.

A battery save signal is provided from the microprocessor controller 14 to a voltage switch/regulator 50 and a current source 52 of the receiver circuit 12 to control the operation of the receiver circuit as described below. The voltage switch/regulator 50 is coupled to the RF front end 30 to activate and deactivate the components of the RF front end in response to the battery save signal. Likewise, the current source 52 is coupled to the receiver back end 32 to control the operation of the components thereof in response to the battery save signal.

The received signal is provided to the microprocessor controller 14 and, more particularly, to an I/O input of a microcomputer decoder and processor 56 for conventional processing of the received signal's information. In a manner well known in the art, the microcomputer 56 is coupled via an I/O output port to a display drive circuit 58 for visually presenting an alphanumeric or numeric display of processed information on the display 18. Via a second I/O output port, the microcomputer 56 is coupled to the output annunciator 20 for audibly presenting processed information.

In processing the information, the microcomputer receives control signals from the user controls 22. The microcomputer 56 also accesses information stored in the nonvolatile code plug memory 16. A second memory 60 is utilized by the microcomputer 56 for reading and writing information during operation. In the operation of the present invention, the microcomputer 56 stores the RSSI signal values in the memory 60 in chronological order. When the microcomputer 56 fails to detect the received signal by failing to detect a predetermined characteristic of the signal, the microcomputer 56 reads a predetermined number of the RSSI values most recently stored in the memory 60.

The microcomputer 56 is coupled to a battery saver control 62 for generation of a battery save signal in accordance with battery saving techniques well known in the art. In operation of the present invention, an out of range battery save routine allows the microcomputer 56 via the battery saver control 62 to operate the receiver circuit in a super battery saver mode, i.e., increases the ratio of the time the receiver circuit 12 is OFF to the time the receiver circuit 12 is ON such that the receiver is activated less frequently, when it is determined that the communications device is out of range of its signal. For a more detailed description of battery saving techniques, reference is made to U.S. Pat. No. 4,518,961, assigned to the assignee of the present invention, and the teachings of which are hereby incorporated by reference.

The microcomputer 56 may provide additional information to the user such as alerts to inform the user of specific events by providing a signal to an alert generator 64 which, depending upon the signal received, provides a predetermined signal to the output annunciator 20 for presentation of an audible alert and/or to the display driver circuit 58 for display of an alphanumeric or numeric message. In operation of the present invention, when the microcomputer 56 determines that the communications device is out of range, the alert generator 64 receives a signal to provide a predetermined alert, for example displaying the words "OUT OF RANGE".

Figure 3:
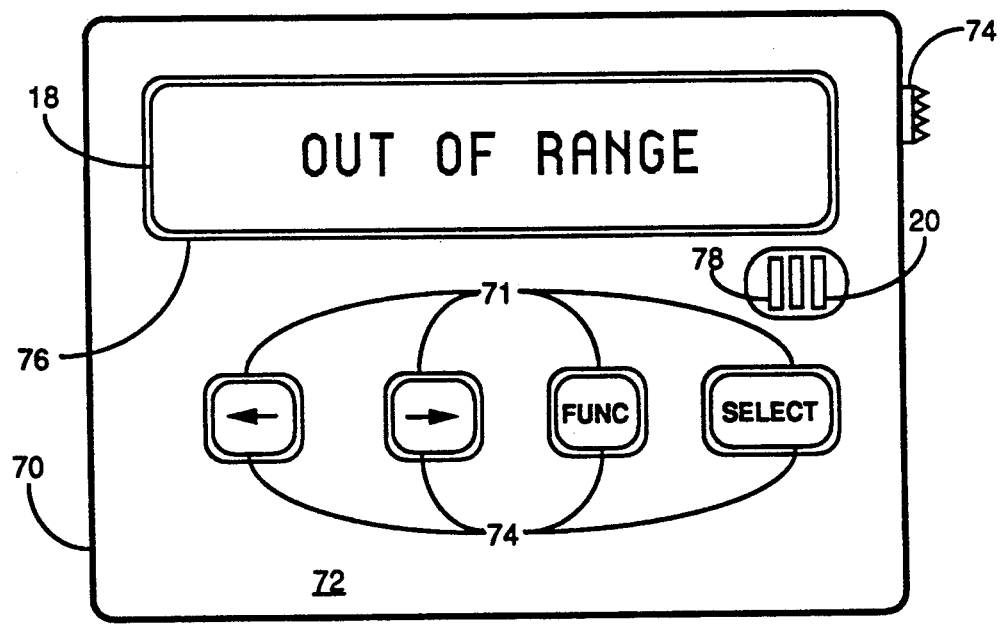
FIG. 3 is a top view of a communications device according to the present invention.

Referring to FIG. 3, a communications device, such as a selective call receiver, according to the present invention comprises a housing 70 including openings 71 in a front plate 72 with user selectable controls 74 accessible therethrough. An on/off user selectable power switch 74 is mounted on the right hand side of the housing 70. The display 18 such as a liquid crystal display (LCD) is viewable through another opening 76 in the front plate 72. The output annunciator 20 is mounted below another opening 78 such that audible information produced by the annunciator 20 can be easily heard by the user.

For a more detailed description of the structure and operation of a selective call radio paging receiver of the communications device type shown in FIGS. 1, 2 and 3, reference is made to U.S. Pat. No. 4,518,961, U.S. Pat. No. 4,649,538, and U.S. Pat. No. 4,755,816, all commonly assigned to the same assignee as the present invention, and the teachings of which are hereby incorporated by reference.

Figure 4:
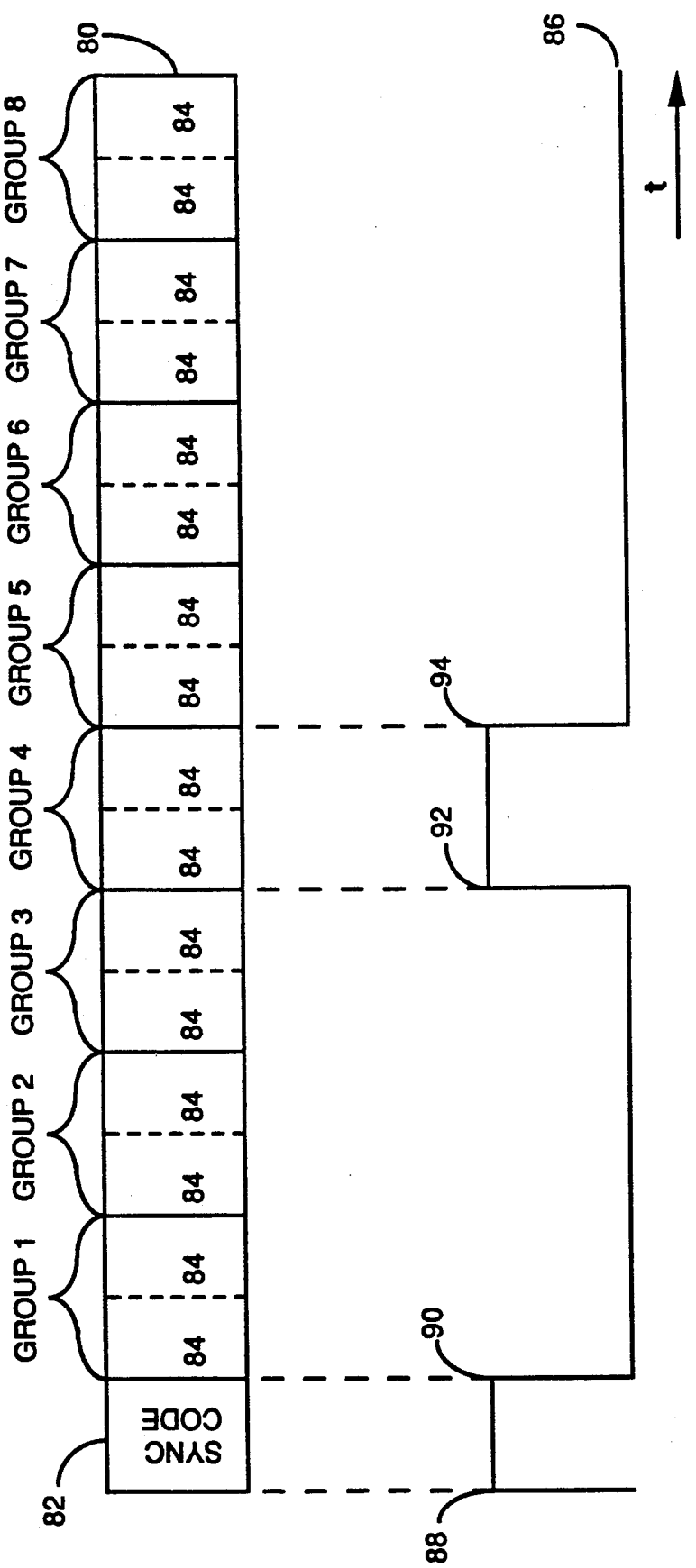
FIG. 4 is a diagram of the signalling protocol and operation of the preferred embodiment according to the present invention.

Referring next to FIG. 4, a diagram of a signalling protocol and the operation of the present invention in response thereto are shown. Signal strength can be monitored continuously and the RSSI values supplied to the microcomputer processor 56 (FIG. 2) for the operation of the present invention. In the preferred operation, though, the microcomputer processor 56 stores the RSSI signal value in the memory 60 (FIG. 2) periodically. In this manner, a table of RSSI sample values is maintained which accurately represents the signal strength variations because the sample values are equally spaced one from another by a predetermined time. Utilizing an appropriate signalling protocol, the periodicity can be defined by the received signal if the signalling protocol comprises a periodically transmitted predetermined portion. For example, many signalling protocols have a periodically transmitted synchronization code (sync code) which allows the communications device to maintain synchronization with the signal. Sampling the received signal strength coincident with the detection of a predetermined characteristic of the signal, such as the sync code, has the added advantage of insuring that the signal for which the received signal strength is measured is indeed the desired signal. One such signalling protocol having a characteristic sync code is the POCSAG signalling code depicted on line 80 typically utilized by selective call network systems.

POCSAG is a binary frequency shift keying (FSK) modulated signalling protocol originally proposed by British Telecom and an anagram for the Post Office Code Standardization Advisory Group. The POCSAG protocol receivers perform separate bit and frame synchronization operations. Bit synchronization is a process used to determine the presence of bit boundaries of a data transmission having bits transmitted at a predetermined baud rate, and thereafter to provide a clock to synchronously sample the bits. Frame synchronization frames the bits transmitted so that the data transmitted is in a form to be decoded thereby indicating various word boundaries such as the first bit of address and data signals.

The preamble of a POCSAG signal comprises a number of zero-to-one transitions in a manner well known in the art. One method for POCSAG bit synchronization is described in U.S. Pat. No. 4,506,262. Generally, with POCSAG signalling, once bit synchronization has been obtained, the receiver remains in synchronous communication with the transmitter until the signal is dropped, i.e., the sequence for initially establishing bit synchronization does not need to be repeated. The first word following the preamble is a sync code word 82 which contains a predetermined binary sequence used for frame synchronization. Sixteen words of information 84 follow before the sync code is repeated.

The sync code 82 provides a means for detection of frame synchronization. The microprocessor controller 14 activates the receiver circuit 12 (FIG. 1) at a time 88 to detect the sync code 82 as depicted on line 86 by providing an appropriate battery save signal. The receiver circuit 12 remains activated until a time 90 which corresponds to the end of the transmission of the sync code 82 at which time the microprocessor controller 14 provides a second battery save signal. The receiver circuit 12 is subsequently activated from a time 92 to a time 94 to look for information words 84 transmitted to a group 96 to which the selective call receiver is assigned b y appropriate signalling from the microprocessor controller 14. After transmission of the sixteen words 84, the sync code 82 is again transmitted and the selective call receiver again operates as shown on line 86.

In the operation of the preferred embodiment of the present invention, the timing within the microprocessor 14 and more particularly within the microcomputer processor 56 (FIG. 2) is utilized to process and store RSSI values. To obtain RSSI values which accurately reflect the received signal strength, each RSSI signal value which is to be stored is calculated upon receipt of a sync code 82 by averaging the RSSI signal over the time since the sync code 82 was last received.

Figure 5:
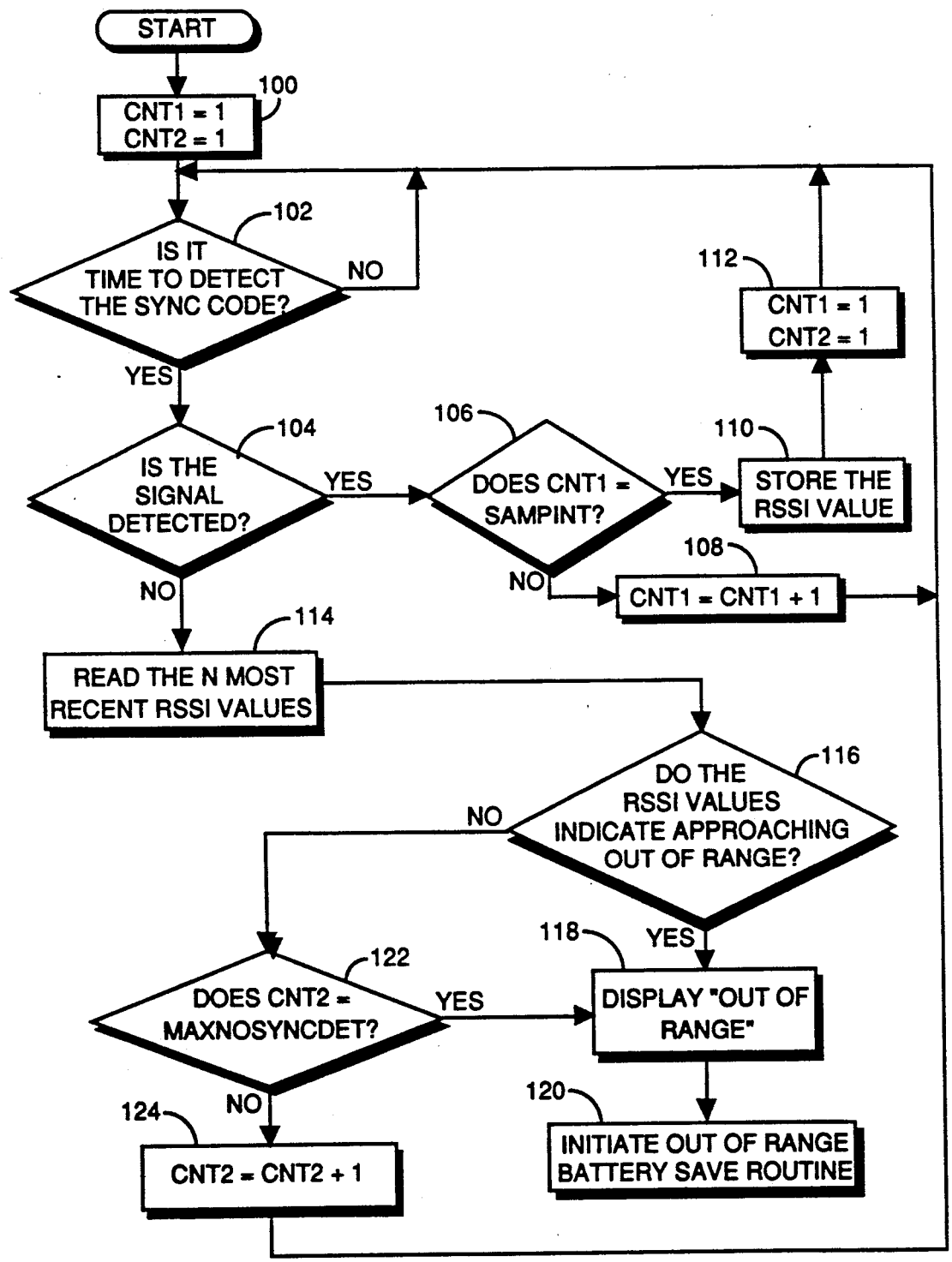
FIG. 5 is a flowchart of the operation of the preferred embodiment of the present invention.

Referring to FIG. 5, the operation of the out of range routine of the microcomputer processor 56 (FIG. 2) of the present invention initially sets two counters, CNT1 and CNT2, to one 100. CNT1 is a counter which measures the number of sync code patterns detected, thereby allowing only one RSSI value out of a predetermined number, SAMPINT, representing a sample interval, to be stored in the memory 60 (FIG. 2). CNT2 is a counter which measures the number of consecutive sync code patterns missed, thereby allowing out of range to be declared independent of the RSSI values if a predetermined number, MAXNOSYNCDET, of consecutive sync code patterns are missed.

If it is time to detect the sync code 102, the processing determines whether the sync code is detected 104. If it is not yet time to detect the sync code 102, processing awaits until it is time. If at the time the sync code is to be detected the signal is present 104, CNT1 is checked to see if it has been incremented to SAMPINT 106, i.e., if it is time to store the RSSI value. If CNT1 does not equal SAMPINT 106, CNT1 is incremented by one 108 and processing returns to await the next time to detect the sync code 102. If CNT1 equals SAMPINT 106, the RSSI value is stored 110 in the memory 60 (FIG. 2) CNT1 and CNT2 are reinitialized to one 112 and processing returns to await the next time to detect the sync code 102.

If at the time the sync code is to be detected the signal is not detected 104, a predetermined number N of the most recently stored RSSI values are read 114. If the RSSI values indicate that the communications device was approaching out of range before loss of the signal 116, the words "OUT OF RANGE" are displayed 118 on the display 18 (as shown in FIG. 3) and an out of range battery save routine is preferably initiated 120. Whether the RSSI values indicate approaching out of range can be determined in several ways. First, if all of the N RSSI values are below a predetermined threshold RSSI value, approaching out of range is indicated. The predetermined threshold RSSI value is set low enough such that a large number of RSSI values below the predetermined threshold value would indicate the communications device is sufficiently far from the transmitter(s) that reception of the signal is not reliable. Secondly, if the N RSSI values are successively decreasing to below a predetermined threshold, approaching out of range is indicated. Successively decreasing RSSI values would be consistent with the communications device travelling further and further from the transmitter(s), thereby approaching the edge of the system coverage area.

If the stored RSSI values do not indicate approaching out of range 116, out of range can nevertheless be declared 118 if CNT2, the number of times the sync code was not detected, reaches the limit value, MAXNOSYNCDET 122. The MAXNOSYNCDET value is set sufficiently high such that when the communications device is carried through a shielded area such as the shadow of a building, an elevator or a subway, the out of range signal will not be generated unless the user is in the shielded area in excess of a predetermined time. If CNT2 does not equal MAXNOSYNCDET 122, CNT2 is incremented by 1 and processing returns to await the next time to detect the sync code. It will be appreciated that this latter override feature by which a large number of missed sync code patterns cause an out of range signal to be generated covers situations in which the received signal can go from a very high level to zero and remain at zero, such as when the communications device user boards an airplane quickly leaving the system coverage area.

By now it should be appreciated that there has been provided an improved, more reliable out of range detector which determines whether a communications device is out of range of its signal in response to the loss of the signal and a history of received signal strength values consistent with approaching out of range. If the received signal strength values measured prior to the loss of the signal indicate that it is unlikely the communications device is out of the reception coverage area of the signal but instead in a low signal area, the out of range indicator is not immediately generated. In this manner, a communications device which temporarily enters a low signal area does not announce that it is out of range nor does it enter a super battery save routine which could cause the device to miss messages.

I claim:

1. A method in a communications receiver for receiving a signal transmitted by a transmitter, the signal having a signal strength, the method comprising the steps of:

measuring the signal at a plurality of times to acquire a plurality of received signal strength values indicating the signal strength at the plurality of times;

storing the plurality of received signal strength values;

detecting loss of the signal; and determining the communications receiver is out of range of the transmitter if both the loss of the signal is detected and ones of the plurality of received signal strength values stored within a predetermined time prior to detection of the loss of the signal indicate successively decreasing signal strength for the predetermined time before the loss of the signal was detected.

2. A method in a communications receiver for receiving a signal transmitted by a transmitter, the signal having a signal strength and comprising a periodically transmitted predetermined portion, the method comprising the steps of:

measuring the signal at a plurality of times to acquire a plurality of received signal strength values indicating the signal strength at the plurality of times, the step of measuring the signal comprising the steps of:

detecting the predetermined portion; and measuring the signal to acquire a signal strength value of the received signal when the predetermined portion is detected;

storing the plurality of received signal strength values;

detecting loss of the signal; and determining the communications receiver is out of range of the transmitter if both the loss of the signal is detected and the received signal strength values stored within a predetermined time prior to detection of the loss of the signal indicate approaching out of range.

3. The method of claim 2 wherein the step of storing comprises the step of storing one of the plurality of received signal strength values once for a predetermined number of multiple detections of the predetermined portion.

4. The method of claim 2 wherein the step of determining comprises the step of determining the communications receiver is out of range of the transmitter if both the loss of the signal is detected and a predetermined number of most recently stored ones of the plurality of received signal strength values have values less than a predetermined threshold value.

5. The method of claim 2 wherein the step of determining comprises the step of determining the communications receiver is out of range of the transmitter if both the loss of the signal is detected and a predetermined number of most recently stored ones of the plurality of received signal strength values have values decreasing from the less recently stored signal strength values to the more recently stored signal strength values.

6. The method of claim 1 further comprising the step of battery saving in response to determining the communications receiver is out of range of the transmitter.

7. The method of claim 1 further comprising the step of generating an out of range signal in response to determining the communications receiver is out of range of the transmitter.

8. The method of claim 7 wherein the step of generating an out of range signal comprises the step of displaying a predetermined message in response to determining the communications receiver is out of range of the transmitter.

9. A communications device comprising:

receiving means for receiving a signal having a signal strength and transmitted from a transmitter;

signal detecting means for detecting loss of the signal;

measuring means for measuring the signal to acquire a plurality of received signal strength values indicating the signal strength at a plurality of times;

memory means for storing the plurality of received signal strength values;

indication means coupled to said memory means and said signal detecting means for generating an out of range signal in response to said signal detecting means detecting loss of the signal if a predetermined number of ones of the plurality of received signal strength values most recently stored before detection of loss of the signal have successively decreasing values; and alert generating means coupled to the indication means for providing an out of range alert in response to the out of range signal when both the loss of said signal is detected as detected by the signal detection means and at least a portion of the plurality of received signal strength values stored prior to detection of the loss of the signal indicate the communications device was approaching out of range of the transmitter as indicated by the indication means.

* * * * *